March 14, 1961

E. H. FLETCHER 2,974,733

HYDRAULIC POWER LIFT AND HITCH SYSTEM
FOR TRACTOR AND IMPLEMENT

Filed Feb. 18, 1957

INVENTOR.
E. H. FLETCHER

March 14, 1961
E. H. FLETCHER
2,974,733
HYDRAULIC POWER LIFT AND HITCH SYSTEM
FOR TRACTOR AND IMPLEMENT
Filed Feb. 18, 1957
3 Sheets-Sheet 2
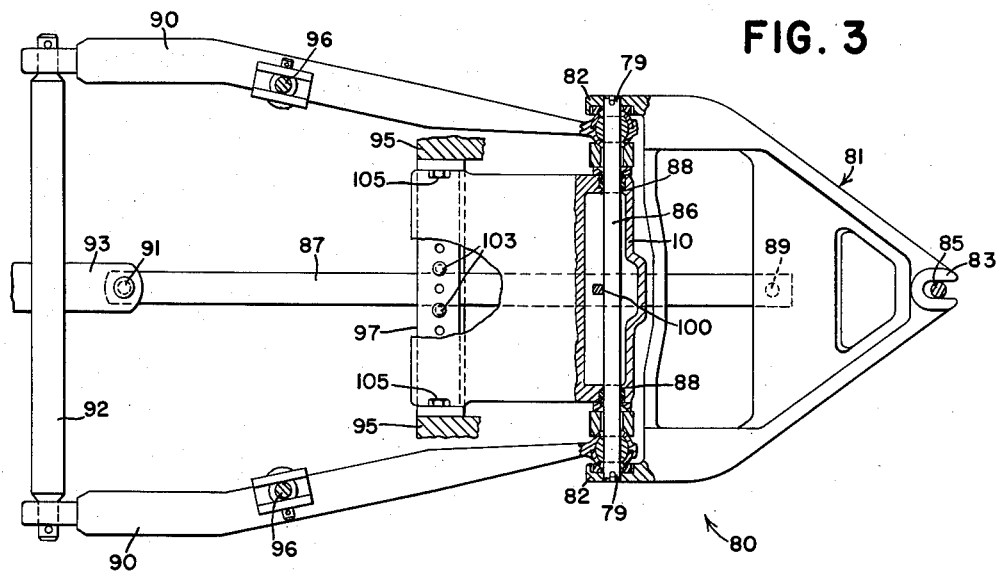
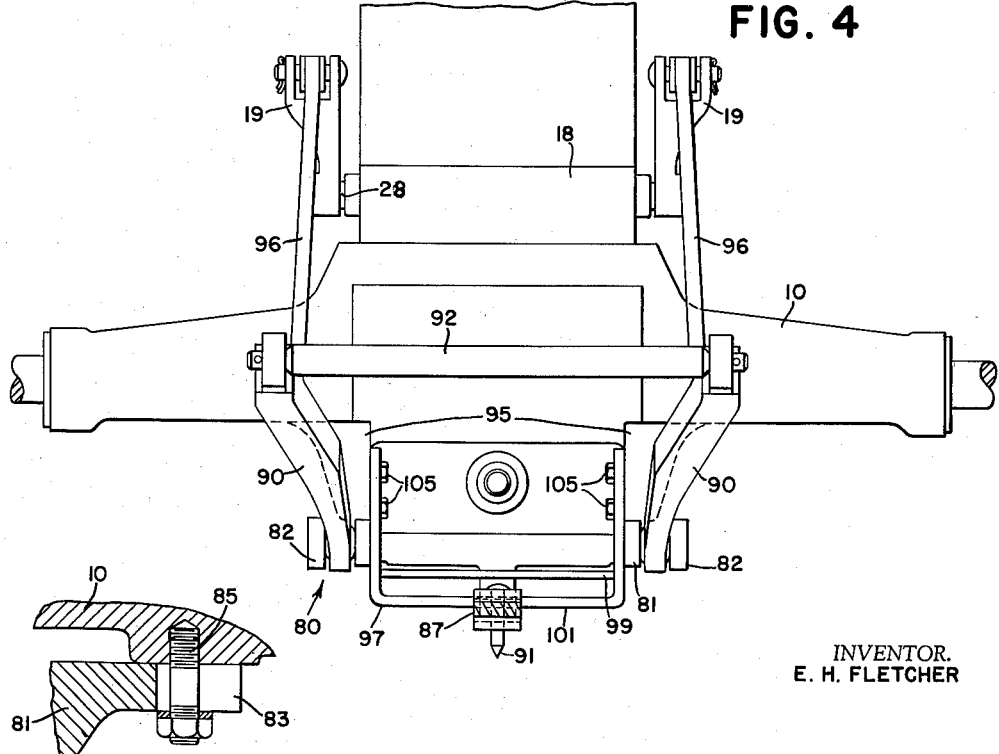
INVENTOR.
E. H. FLETCHER

INVENTOR.
E. H. FLETCHER

United States Patent Office 2,974,733
Patented Mar. 14, 1961

2,974,733
HYDRAULIC POWER LIFT AND HITCH SYSTEM FOR TRACTOR AND IMPLEMENT

Edward H. Fletcher, Cedar Falls, Iowa, assignor, by mesne assignments, to Deere & Company, a corporation of Delaware Filed Feb. 18, 1957, Ser. No. 640,713

21 Claims. (Cl. 172—7)

This invention relates to a tractor-implement arrangement and more particularly to improved hitch and hydraulic power control therefor.

It is known, of course, to connect an integral implement with a tractor in such manner that variations in draft load imposed on the implement are signaled to appropriate means on the tractor, such as a fluid control valve, for supplying and exhausting a tractor-mounted hydraulic motor which will in turn change the vertical adjustment of the implement to accommodate the changes in draft load. According to the present invention, this system is modified to include an extension of the hydraulic power lift system to a fluid motor located remotely from the tractor and operative on a trailing rather than an integral implement. The invention features the provision of improved means whereby the remote motor may be connected to and disconnected from the integrated fluid system on the tractor. A still further object is to provide a dual hitch means, part of which may be used for so-called three-point hitch arrangements and another part of which may be used for drawn implements. In this respect, it is a feature of the invention to achieve draft or load control via mechanism cooperative in common with either hitch part. Further objects of the invention reside in improved coupling means, including coupling valve means, and selector valve means operative to isolate the tractor-mounted motor from the control valve when the remote motor is used.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Fig. 3 is an enlarged fragmentary section on the line 3—3 of Fig. 1.

Fig. 4 is a fragmentary rear elevation of the tractor with the implement removed.

Fig. 5 is a fragmentary view, partly in section, showing the mounting of the front end of the main hitch member.

Figure 1:
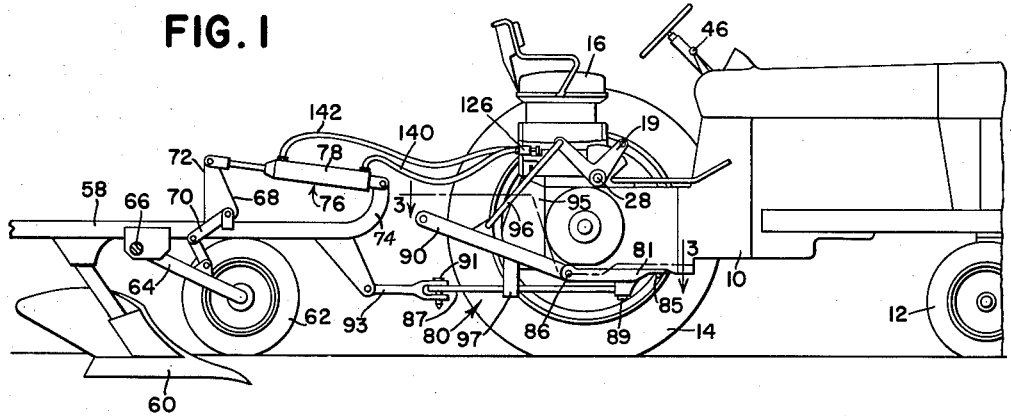
Fig. 1 is a fragmentary side view of a tractor and implement arrangement, the near rear wheel of the tractor having been removed to expose major portions of the hitch and control system.

The tractor chosen for the purposes of illustration will be recognized as a popular commercial type having a main body 10 carried on front wheels 12 and rear traction wheels 14, only one of the latter being visible. The rear portion of the tractor body carries a typical operator's seat 16 below which is a housing 18 that encloses or otherwise contains a tractor-mounted hydraulic motor 20. In its simplest form, the housing 18 includes an internal cylinder 22 in which a piston 24 travels to transmit force via a piston rod 26 to a transverse tractor-mounted rockshaft 28. The rockshaft extends beyond opposite sides of the housing 18 and has lift arms, such as bell cranks 19, secured to its opposite ends. The arrangement in general is typical of conventional tractor construction and need not be elaborated.

The basic tractor includes a source of fluid under pressure, here including a pump P and a reservoir R. A control valve 30 includes a chamber 32 connected at one side by a motor line 34 to the motor 20 and at its other side by a reservoir line 36 to the reservoir R. Fluid under pressure is admitted to the chamber 32 from the pump P via a spring loaded poppet valve 38 and the chamber is exhausted to the passage 36 via a second spring loaded poppet valve 40. Both of these valves are normally biased to their closed positions and are openable selectively by a rockable operator 42 that is pivoted at 44 on the valve 30. For example, when the operator 42 is rocked in a clockwise direction about its pivot 44, the poppet valve 38 is raised and the other poppet valve 40 remains closed. Thus, fluid under pressure is admitted from the pump P to the tractor-mounted motor 20. When the operator 42 is rocked in the opposite direction, the poppet valve 40 is opened and fluid from the motor 20 is exhausted to the reservoir R via the line 34, chamber 32 and line 36.

The control valve 30, as will be hereinafter described in detail, is under control of three initiating sources. For the present, only one of these—the manual control—will be described. This control means takes the form of a rockable and selectively settable hand lever 46 mounted on the tractor in any suitable fashion and connected remotely, as via a sheathed cable 48, to a valve control lever 50. This lever is connected at one end to the cable 48 and is pivotally connected at 52 at its other end to the operator 42. Ignoring for the moment the details of the mechanism associated with the lever 50, let it be noted solely that the lever is fulcrumed intermediate its ends at 54, so that rocking of the hand lever 46 forwardly or in a clockwise direction operates to swing the lever 50 in a counterclockwise direction which in turn swings the operator 42 in a clockwise direction to open the poppet valve 38, whereby fluid under pressure is introduced to the left hand end of the motor 20 (right hand end in Fig. 2), thus rocking the rockshaft 28 in a clockwise direction.

From the description thus far, it will be seen that rocking of the tractor-mounted rockshaft 28 is under control of the hand lever 46 via the control valve 30. As indicated above, the control valve 30 is responsive to an additional source of input, and this will be described below.

The implement chosen for purposes of illustration is a plow, here having a main frame 58, a plow bottom 60, and supporting wheels, only one of which is illustrated at 62 and which is connected to the plow frame 58 by a cranked axle 64. The cranked axle and wheel represent an adjustable part on the implement whereby the plowing depth may be varied by turning the axle 64 about its pivotal connection 66 with the plow frame 58. For this purpose, the frame 58 rockably supports a bell crank 68 having one arm linked at 70 to the crank axle 64 and having its other arm 72 in rearwardly spaced relation to an upwardly extending integral forward portion 74 of the plow frame 58. This is substantially conventional construction and the portion 74 and arm 72 serve as means for mounting a remote hydraulic motor 76, the cylinder 78 of which is clevis-connected to the plow frame portion 74 and the piston rod of which is similarly clevis-connected to the arm 72 of the bell crank 68, whereby extension and retraction of the motor will respectively raise and lower the plow frame 58 relative to the ground and accordingly will vary the plowing depth of the bottom 60. As will be understood, the draft load on the implement will vary according to the plowing depth.

The implement is connected to the tractor by hitch means 80. For this purpose, the rear portion of the tractor carries a transverse hitch bar 86 of resilient nature that is capable of bending transverse to its axis, and this bar is supported in the body portion adjacent opposite ends of the bar at fulcrum points 88, leaving opposite end portions of the bar projecting at 79 to respectively pivotally receive the forward ends of laterally spaced apart hitch links 90. The connection of the links 90 to the hitch bar 86 is such that the links may have vertical movement relative to the bar about the axis of the bar but without turning the bar. The links 90 extend rearwardly and are cross-connected by a transverse bar 92 on which suitable so-called integral implements may be mounted. Each link 90 is connected by a lift link 96 to the associated lift arm 19 on the tractor rockshaft 28. Hence, rocking of the rockshaft 28 will operate through the lift links 96 to elevate and depress the lift links 90. In the instant case, the links 90 and transverse bar 92 represent a part of the hitch means that is not used with the drawn plow and therefore the motor 20 is preferably operated to elevate the links 90 as shown in Fig. 1, thus facilitating the use of a second part of the hitch means 80.

This second part of the hitch means 80 comprises an element 81 conveniently referred to here as an A-frame having a forward guide or slot 83 and a pair of rear, laterally spaced apart apertured ears 82 which respectively receive the projecting ends 79 of the bending bar 86 just outwardly of the respective draft links 90. The slotted part 83 of the A-frame is supported from below by a stud or bolt 85 threaded into an under portion of the tractor body (Fig. 5). When this stud is sufficiently loose so as not to effect a clamping action of the A-frame, that frame may have limited fore-and-aft shifting, which of course depends upon the direction of bending of the bar 86.

A rearwardly extending central drawbar 87 is pivoted at its forward end at 89 to a midportion of the A-frame and extends rearwardly for connection at 91 to the plow hitch 93. A rear housing portion 95 of the tractor rigidly supports a transverse U-shaped member 97 having spaced apart upper and lower straps 99 and 101 between which the drawbar passes. Pins 103 are received at opposite sides of the drawbar to normally prevent lateral swinging of the drawbar about its pivot 89. Since the U-shaped member 97 is rigidly secured at 105 (Fig. 4) to the tractor housing portion 95 and since the drawbar 87 is vertically confined by the straps 99 and 101, the drawbar is secured against vertical displacement. However, the drawbar is free to shift fore-and-aft with the A-frame 81, because the pins 103 confine the drawbar only against lateral shifting. Thus, fore or aft draft forces applied to the drawbar will be transmitted through the A-frame 81 to the bending bar 86 via 82—79. If an implement is connected to the properly adjusted draft links 90, the bending bar 86 will deflect according to variations in draft load, as in assignee's Patent 2,940,530, issued from copending application Ser. No. 730,743, filed April 16, 1958 as a continuation of Ser. No. 513,352, filed June 6, 1955, now abandoned.

The above points up the duality of the hitch means 80, wherein the bending bar 86 is common to both parts as means for receiving a draft signal. That is to say, the hitch has one implement-receivable hitch part comprising the links 90 and another implement-receivable hitch part comprising the drawbar 87 and A-frame 81 and both parts transmit draft forces to the bending bar 86 which operates also as means for signaling draft load changes to the control valve 30.

For this purpose, the hitch bar 86 is bendable fore-and-aft according to variations in forces in tension or compression in the hitch means, in the instant case via the hitch part comprising the drawbar 87 and the A-frame. As seen in Fig. 3, the bar 86 is fulcrumed at 88 and the midportion thereof may have fore-and-aft movement as the extreme outer ends 79 of the bar 86 are deflected. Deflection of the midportion of the bar 86 is relayed to the control valve 30, and for this purpose the tractor body 10 carries internally thereof a fulcrum 98 on which a draft responder lever 100 is pivoted. The lower portion of this lever engages behind the intermediate portion of the bar 86 so that as the intermediate portion of the bar 86 is deflected fore-and-aft, the lever 100 is rocked. The upper end of the lever 100 carries a bracket 102 on which a follower lever 104 is pivoted at 106. A spring 108 biases the follower lever 104 into engagement with a cam 110 fixed to the transverse rockshaft 28. A link 112 is connected to the valve control lever 50 at the previously described fulcrum 54 and at its other end has a roller 114 which engages a portion of the follower lever 104 adjacent to the follower lever pivot 106 on the bracket 102. A tension spring 116 is connected at one end to the fulcrum 54 and is anchored at 118 at its other end to a suitable portion of the tractor body, thereby resiliently maintaining engagement of the roller 114 with the follower lever 104. For purposes not material here, the position of the roller 114 vertically relative to the follower lever 104 is maintained by a link 120 and a selector lever 122. For present purposes, it will be assumed that the selector lever 122 occupies the position illustrated, whereby the roller 114 substantially maintains its vertical position relative to the follower lever 104 but is capable of fore-and-aft swinging because of the pivotal suspension by the link 120.

From the description thus far, it will be seen that increase in draft load on the plow bottom 60 will be transmitted to the hitch bar 86 by tensional forces in the drawbar 87 and A-frame 81, bending the outer ends 79 of the bar rearwardly and causing forward deflection of the central portion of the bar. As the central portion of the bar deflects forwardly, it is followed by the lower end of the draft lever 100, because the spring 108 is urging the follower lever 104 constantly against the rockshaft cam 110. This results in rearward displacement of the follower lever 104 in the vicinity of the pivot 106 and that transmits a rearward force through the link 112 to the fulcrum 54 on the valve control lever 50. Since the position of the hand lever 46 is fixed, the pivotal connection between the valve control lever 50 and the rear end of the sheathed cable 48 now becomes a fulcrum about which the link 112 swings the valve control lever 50 in a counterclockwise direction. This is the same kind of force that would be transmitted by moving the hand control lever 46 forwardly. Accordingly, the actuating member 42 for the valve 30 is rocked clockwise, elevating the poppet valve 38 and supplying fluid under pressure to the motor 20, whereupon the rockshaft 28 is turned clockwise to exert a lifting force through the lift links 96 on the hitch links 90. Now, if a so-called integral implement were connected to the tractor via the hitch links 90, the position of that implement relative to the ground would be changed. However, the presently disclosed implement is a trailing implement and uses the drawbar 80, and it remains only to transmit the draft signal and its effect on the control valve 30 to the remote motor 76 rather than to the tractor-mounted motor 20. This is accomplished in the manner to be described immediately below.

The housing 18 which contains or supports the tractor-mounted motor 20 includes a housing portion 124 which incorporates a coupling receiver 126. The housing portion 124 has a chamber 128 to which the fluid line 34 from the valve 30 leads. A second passage 130 connects the chamber 128 to the cylinder 22 of the motor 20; and a third passage 132 leads from the chamber 128 and terminates as a remote motor outlet 134 in the fluid receiver 126.

A selector valve 136 traverses the chamber 128 and is adapted to open, close or throttle the passage 130 to the cylinder 22. When the selector valve is closed, the motor 20 is cut off from the valve 30, leaving the remote motor outlet 34 in communication with the valve. When the selector valve is open, the motor 20 and remote motor outlet 34 are connected to the control valve 30 in parallel. As will be obvious, the selector valve can be adjusted to provide metered flow of fluid to and from the motor 20.

In addition to the remote motor outlet 134, the receiver 126 includes a remote motor return chamber 138 and the outlet and the chamber are respectively connectible to opposite ends of the remote motor 76 by fluid lines 140 and 142. Specifically, the line 140 is connected at one end to the motor 76 and at its other end has coupling means 144 receivable by the receiver 126 via a fore-and-aft bore 146. The other line 142 has a coupling means 148 associated with the receiver 126 via a parallel bore 150. The couplings 144 and 148 are preferably tubular and are closed and interconnected at their ends remote from their respective connections to the lines 140 and 142. However, the couplings are apertured respectively at 152 and 154 for communication at times respectively with the remote motor outlet 134 and the remote motor return 138, the latter of which is connected by a suitable line 156 to the reservoir R. Although separate valve means could be used to establish communication between the control valve 30 and the remote motor 76, it is preferred that the valve means be incorporated in the couplings 144 and 148. Accordingly, the couplings are bi-positionable and, since they are interconnected at their ends, as previously described, as by a cross member 158, the couplings move in unison, being selectively retained in either forward positions (Fig. 6) or rearward positions, by appropriate detent means 160.

Figure 6:
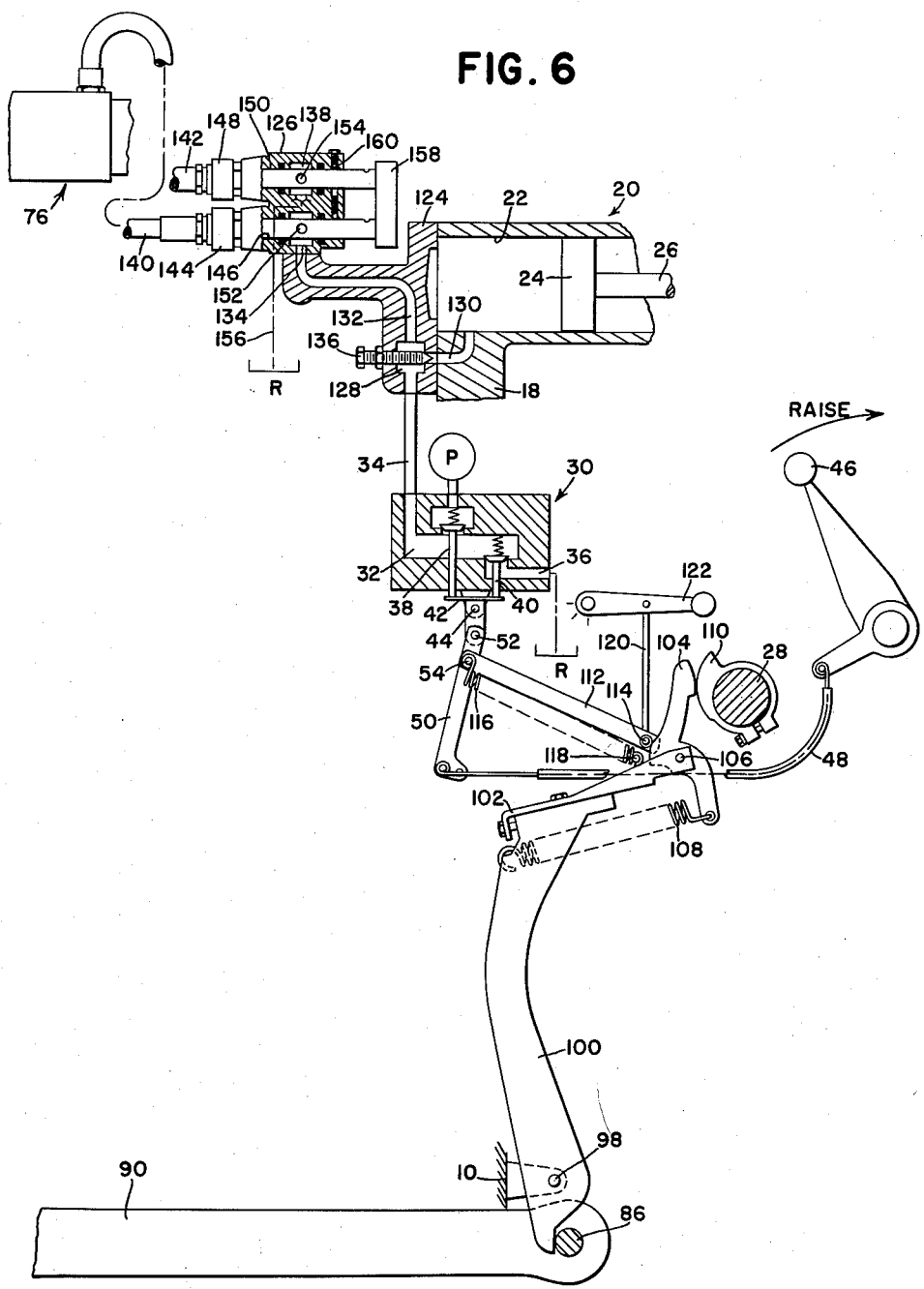
Fig. 6 is a combination schematic and sectional view illustrating the component parts of the control system.

As will be seen in Fig. 6, the couplings have their apertures 152 and 154 respectively in communication with the remote motor outlet and the remote motor return 134 and 138 respectively, whereby the remote motor is connected to the valve 30 parallel with the tractor-mounted motor 20. When the couplings are shifted rearwardly in unison, the apertures 152 and 154 become misaligned with the outlet and return and the couplings present imperforate portions to said outlet and return whereby the remote motor 76 is in effect disconnected from the receiver 126. In addition, the lines 140 and 142 may be respectively disconnected from the couplings 144 and 148 for complete removal of the remote motor.

The operation of the system without the remote motor has been previously described. The operation with the remote motor is as follows.

With the couplings 144 and 148 in their rear positions, so that the remote motor outlet 134 and return 138 are isolated from the remote motor, and with the selector valve 136 open, the hand lever 46 is manipulated to secure the desired position of the rockshaft, which is obtained by fluid pressure adjustment of the motor 20, since the motor is still connected to the control valve 30. This will select the appropriate height of the hitch links 90, since the rockshaft 28 controls the height of the hitch via the lift links 96. When the desired position is attained, the selector valve 136 is turned in to cut off the passage 130, thus isolating the motor 20 from the tractor hydraulic system and accordingly maintaining or hydraulically locking the position of the rockshaft 28, at least against lowering of the hitch links 90.

Assuming that the couplings 144 and 148 are connected to the coupling extensions in which the apertures 152 and 154 are formed, the couplings are then shifted to their respective forward positions, which will be achieved in unison because of the connector 158. The valve means incorporated in the couplings will now cause registry between the apertures 152 and 154 and the remote motor outlet 134 and the remote motor return 138.

With the connections made as aforesaid, the remote motor 76 now partakes of the same type of control that would be applied to the tractor-mounted motor 20. That is to say, changes in draft load incurred by the implement are transmitted through the drawbar 87 to the draft responder lever 100 to signal to the valve 30 such changes in draft load and the valve 30 will in turn control the motor 76 for adjusting the crank axle 64 and wheel 62 on the plow and will accordingly vary the operating depth of the plow bottom 60. Thus, there has been effected, in brief, a load responsive remote motor, utilizing substantially the structure that existed on the tractor as equipped for load-responsive control of the tractor-mounted cylinder or motor.

Figure 2:
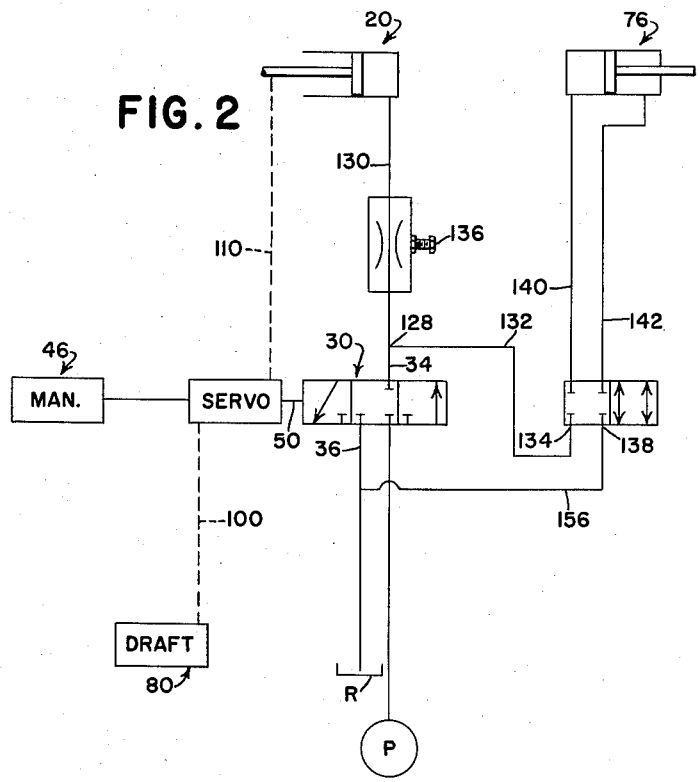
Fig. 2 is a schematic view of the hydraulic system.

For the purpose of elaboration somewhat on Fig. 2, it will be noted that the three boxes are designated respectively "Man.," "Servo" and "Draft." The first designates the manual control and the "Draft" box designates the draft responsive means. The "Servo" box represents the linkage situated in Fig. 6 between the rockshaft 28 and the control valve 30, which linkage is of course connected to the control valve via the valve lever 50. The broken line between the motor 20 and the servo box represents the cam 110 and the position-control characteristics of the system, which characteristics, although illustrated, are not described here since they play no part in the present invention. However, for the purposes of explaining these briefly, let it be noted that the draft control characteristics can be locked out by moving the selector lever 120 to its maximum upward position, which moves the roller 114 to the upper end of the follower lever 104. Since the draft or load-responsive characteristics depend upon shifting of the roller 114 via the follower 104, it will be seen that when the roller is at the upper end of the lever 104 the movement of the link 112 is negligible. However, at this position the roller 114 will reflect movement of the rockshaft 28 via the cam 110 and accordingly the control valve 30 will be responsive to changes in position of the rockshaft. The selector lever 122 is intermediately adjustable to place the roller 114 at selectively varying positions along the rear arcuate edge of the follower lever 104 so that the system will partake of both draft- and position-responsive characteristics. These details as such form the subject matter of assignee's copending application Ser. No. 516,347, filed June 20, 1955, now Patent No. 2,864,295. The details of the hitch bar and the role it plays in draft control broadly form the subject matter of aissgnee's copending application Ser. No. 730,743, filed April 16, 1958, now Patent No. 2,940,530, referred to above.

The incorporation of the coupling receiver 126 and its associated outlet 134 and return 138 in conjunction with the selector valve 136 enables the use of the selector valve as a throttling or metering device for the tractor-mounted cylinder in those instances in which the remote motor is not used, plus the additional feature of providing for ready connection of the remote motor to the hydraulic system so that said motor will receive the benefits of the hydraulic system formerly applicable only to the tractor-mounted motor. When the hitch part comprising the links 90 is used for draft control, the stud 85 may be tightened to fix the position of the A-frame, thus rigidifying the A-frame against fore-and-aft shifting, in which case the openings in the A-frame ears 82 can serve as stops limiting fore-and-aft deflection of the outer ends 79 of the bar 86. Other advantages and modifications of the preferred embodiment illustrated will readily occur to those versed in the art, all of which may be achieved without departure from the spirit and scope of the invention.

What is claimed is:

1. In a tractor and implement arrangement in which the implement has an adjustable part subject to variations in draft load, the tractor has a hydraulic power system including a transverse rockshaft, a tractor mounted hydraulic motor connected to the rockshaft, a fluid pressure source and a control valve for said motor, and the tractor and implement are connected by means operative to signal draft load changes to said valve for supplying and exhausting said motor, the improvement comprising: a remote hydraulic motor on the implement and connected to and for adjusting said implement part; a coupling receiver on the tractor having a fluid outlet connected to the control valve in parallel with the tractor-mounted motor; an external fluid line connected at one end to the remote motor; coupling means on the other end of said line and receivable by said receiver; coupling valve means for selectively opening and closing said fluid outlet; and normally open selector valve means on the tractor and operative between the control valve and the tractor-mounted motor to cut off said tractor-mounted motor whereby the coupled remote motor is under control of the control valve when the coupling valve means is open.

2. The invention defined in claim 1, in which: the coupling means is bi-positionable in the receiver and includes the coupling valve means for operation in one position to open said fluid outlet and in its other position to close said outlet.

3. The invention defined in claim 1, in which: the selector valve includes a metering portion effective to meter fluid flow between the control valve and the tractor-mounted motor when the coupling valve means is closed.

4. In a tractor and trailing implement arrangement in which the implement has an adjustable part subject to variations in draft load, the tractor has a hydraulic power system including a transverse rockshaft, a tractor-mounted hydraulic motor connected to the rockshaft, a fluid pressure source and a control valve for said motor, and the tractor and implement are connected by hitch means vertically adjustable by the rockshaft and operative to signal draft load changes to said valve for supplying and exhausting said motor, the improvement comprising: a remote hydraulic motor on the implement and connected to and for adjusting said implement part; a coupling receiver on the tractor having a fluid outlet connected to the control valve in parallel with the tractor-mounted motor; an external fluid line connected at one end to the remote motor; coupling means on the other end of said line and receivable by said receiver; coupling valve means for selectively opening and closing said fluid outlet; and selector valve means on the tractor having an open position, when the coupling means valve is closed, connecting the tractor-mounted motor to the control valve for operation of said rockshaft, and a closed position effective, when the coupling valve means is open, to isolate said tractor-mounted motor from said control valve so that the coupled remote motor is exclusively under control of said control valve.

5. In a tractor and implement arrangement in which the implement has an adjustable part subject to variations in draft load, the tractor has a hydraulic power system including a transverse rockshaft, a tractor mounted hydraulic motor connected to the rockshaft, a fluid pressure source and a control valve for said motor, and the tractor and implement are connected by means operative to signal draft load changes to said valve for supplying and exhausting said motor, the improvement comprising: a remote hydraulic motor on the implement and connected to and for adjusting said implement part; a housing portion on the tractor including a fluid chamber a first, second and third fluid passages connecting said chamber respectively to the control valve, the tractor-mounted motor and a remote motor outlet; a selector valve in said housing portion for selectively opening and closing the second passage; an external fluid line connected at one end to the remote motor; coupling means on the other end of said line and receivable by said housing portion to connect the remote motor to said remote motor outlet when the selector valve is closed and to disconnect said remote motor from said remote motor outlet when said selector valve is open; and coupling valve means for selectively opening and closing said remote motor outlet.

6. The invention defined in claim 5, in which: the coupling means is bi-positionable in the housing portion and includes the coupling valve means for operation in one position to open said remote motor outlet and in its other position to close said outlet.

7. In a tractor and trailing implement arrangement in which the implement has an adjustable part subject to variations in draft load, the tractor has a hydraulic power system including a transverse rockshaft, a tractor-mounted hydraulic motor connected to the rockshaft, a fluid pressure source and a control valve for said motor, the improvement comprising: a first hitch part vertically adjustable by the rockshaft; signal means operative by said hitch part to signal draft load changes to said valve for supplying and exhausting said motor; a second hitch part connected to the implement and connected also to said signal means; a remote hydraulic motor on the implement and connected to and for adjusting said implement part; and fluid-transmitting and control means for connecting the remote motor to the control valve in substitution for the tractor-mounted motor for supplying and exhausting said remote motor in accordance with draft load changes signalled to said control valve by the second hitch part.

8. For a tractor having power adjusting means for effecting the adjustment of an associated implement and actuating means for selectively activating and deactivating the power adjusting means: draft load control means comprising a support on the tractor; an inherently resilient bar carried by the support for temporary deflection from normal when stressed in bending; a movable signal member operatively connected to the actuating means and engaging the bar; and first and second separate hitch parts optionally connectible to an associated implement and connected to the bar for stressing the bar in bending in response to implement draft loads so as to deflect the bar and incur movement of the signal member and consequent activation of the power adjusting means.

9. The invention defined in claim 8, in which: the first hitch part includes a hitch member slidably carried by the tractor for fore-and-aft movement and engaging the bar and the second hitch part is connected directly to the bar.

10. The invention defined in claim 8, including: additional power adjusting means; and means for connecting said additional power adjusting means to the actuating means in substitution for the first-mentioned power adjusting means.

11. For a tractor having power adjusting means for effecting the adjustment of an associated implement and actuating means for selectively activating and deactivating the power adjusting means: draft load control means comprising an elongated inherently resilient bar having opposite end portions and a midportion; a support mounting the bar on the tractor, including a pair of fulcra spaced apart lengthwise of the bar and engaging the bar respectively short of its end portions so that implement loads applied to the end portions of the bar in directions transverse to the length of the bar will stress the bar in bending to cause temporary deflection of the midportion of the bar; a movable signal member operatively connected to the actuating means and engaging the midportion of the bar to be moved in response to deflection of said midportion; a first implement hitch part connected to and supported in part by the end portions of the bar; means additionally supporting the hitch part on the tractor for relative fore-and-aft shifting of said part; means for draft-connecting said part to an associated implement for shifting said part to transmit draft forces via said part to the ends of the bar; and a second hitch part including draft links connected respectively to said ends of the bar.

12. For a tractor having power adjusting means for effecting the adjustment of an associated implement and actuating means for selectively activating and deactivating the power adjusting means: draft load control means comprising an elongated inherently resilient bar having opposite end portions and a midportion; a support mounting the bar on the tractor, including a pair of fulcra spaced apart lengthwise of the bar and engaging the bar respectively short of its end portions so that implement loads applied to the end portions of the bar in directions transverse to the length of the bar will stress the bar in bending to cause temporary deflection of the midportion of the bar; a movable signal member operatively connected to the actuating means and engaging the midportion of the bar to be moved in response to deflection of said midportion; an implement hitch part connected to and supported in part by the end portions of the bar; means additionally supporting the hitch part on the tractor for relative fore-and-aft shifting of said part; and means for draft-connecting said part to an associated implement for shifting said part to transmit draft forces via said part to the ends of the bar.

13. For a tractor having power adjusting means for effecting the adjustment of an associated implement and actuating means for selectively activating and deactivating the power adjusting means: draft load control means comprising an elongated inherently resilient bar having opposite end portions and a midportion; a support mounting the bar on the tractor, including a pair of fulcra spaced apart lengthwise of the bar and engaging the bar respectively short of its end portions so that implement loads applied to the end portions of the bar in directions transverse to the length of the bar will stress the bar in bending to cause temporary deflection of the midportion of the bar; a movable signal member operatively connected to the actuating means and engaging the midportion of the bar to be moved in response to deflection of said midportion; an implement hitch part connected to the end portions of the bar; means supporting the hitch part on the tractor for relative fore-and-aft shifting of said part; and means for draft-connecting said part to an associated implement for shifting said part to transmit draft forces via said part to the ends of the bar.

14. For a tractor having power adjusting means for effecting the adjustment of an associated implement and actuating means for selectively activating and deactivating the power adjusting means: draft load control means comprising an elongated inherently resilient bar having opposite end portions and a midportion; a support mounting the bar on the tractor, including a pair of fulcra spaced apart lengthwise of the bar and engaging the bar respectively short of its end portions so that implement loads applied to the end portions of the bar in directions transverse to the length of the bar will stress the bar in bending to cause temporary deflection of the midportion of the bar; a movable signal member operatively connected to the actuating means and engaging the midportion of the bar to be moved in response to deflection of said midportion; a fore-and-aft A-frame having an apex end and a pair of leg portions at its opposite end, said leg portions being coaxially apertured and respectively receiving the ends of the bar; and means connecting the apex end of the A-frame to the tractor for relative fore-and-aft shifting of said A-frame.

15. The invention defined in claim 14, in which: said last-named means is lockable to secure the A-frame against shifting.

16. The invention defined in claim 15, including: a central drawbar connected to and extending rearwardly from the A-frame.

17. For a tractor having power adjusting means for effecting the adjustment of tractor-associated implements and actuating means for selectively activating and deactivating the power adjusting means: draft load control means comprising a support on the tractor; an inherently resilient bar carried by the support for temporary deflection from normal when stressed in bending; a movable signal member operatively connected to the actuating means and engaging the bar to be moved in response to deflection of the bar; a first hitch part; means supporting said hitch part on the tractor for fore-and-aft movement and engaging the bar; a second hitch part engaging the bar; first and second means respectively on the first and second hitch parts for optional connection to tractor associated implements; and means cooperative between the tractor and the first hitch part for limiting fore-and-aft movement of the first hitch part.

18. In a tractor having a mounted hydraulic motor controlled by a valve responsive to tractor-carried draft signal means, the improvement comprising: a first implement-receiving hitch part on the tractor and connected to the mounted motor and to the draft signal means for incurring operation of said mounted motor in response to implement draft forces received by said hitch part; a remote hydraulic motor; means fluid-connecting the remote motor to the valve; means for cutting the mounted motor off from the valve for exclusive operation of the remote motor; and a second implement-receiving hitch part on the tractor and connected to the draft signal means for incurring operation of the remote motor in response to implement draft forces received by said second hitch part.

19. In a tractor and implement arrangement in which the implement has an adjustable part subject to variations in draft load, the tractor has a hydraulic power system including a transverse rockshaft, a tractor mounted hydraulic motor connected to the rockshaft, a fluid pressure source and a control valve for said motor, and the tractor and implement are connected by means operative to signal draft load changes to said valve for supplying and exhausting said motor, the improvement comprising: a remote hydraulic motor on the implement and connected to and for adjusting said implement part; a coupling receiver on the tractor; an external fluid line connected at one end to the remote motor; coupling means on the other end of said line and receivable by said receiver; and selector valve means on the tractor and operative among the receiver, the control valve and the tractor-mounted motor for connecting the control valve optionally to the tractor-mounted motor or to the receiver for incurring optional operation of the tractor-mounted or remote motors by the control valve in response to draft load changes signalled to said control valve.

20. For a tractor having a longitudinal body element, the combination therewith of a fore-and-aft draft element having a front portion and a pair of laterally spaced apart rear portions; means mounting said front portion on the body element for fore-and-aft shifting of the draft element relative to the body element; an inherently resilient bar; first means connecting the bar to the body element and affording a fulcrum about which the bar is stressible in bending; second means connecting the bar to the draft element rear portions at load points spaced lengthwise of the bar from the fulcrum so that fore-and-aft shifting of the draft element is yieldingly resisted by the bar in bending; and implement-receivable draft means on the draft element for connecting the draft element to an implement.

21. For a tractor having a longitudinal body element, the combination therewith of a fore-and-aft draft element having a front portion and a pair of laterally spaced apart rear portions; means mounting said front portion on the body element for fore-and-aft shifting of the draft element relative to the body element; an inherently resilient bar; first means connecting the bar to the body element and affording a fulcrum about which the bar is stressible in bending; second means connecting the bar to the draft element rear portions at load points spaced lengthwise of the bar from the fulcrum so that fore-and-aft shifting of the draft element is yieldingly resisted by the bar in bending; and a pair of laterally spaced apart implement-receivable draft means connected to the bar at opposite sides of the fulcrum for connecting the bar to an implement.

References Cited in the file of this patent

UNITED STATES PATENTS

| | | |
|---|---|---|
| Re. 24,006 | Acton | May 24, 1955 |
| 2,679,199 | Strehlow | May 25, 1954 |
| 2,722,804 | Stickney | Nov. 8, 1955 |
| 2,730,029 | Brundage | Jan. 10, 1956 |
| 2,777,375 | Carlin et al. | Jan. 15, 1957 |